US011950342B2

(12) United States Patent
Tomasovics et al.

(10) Patent No.: US 11,950,342 B2
(45) Date of Patent: Apr. 2, 2024

(54) SYSTEMS AND METHODS FOR DYNAMIC CONTROL AND MONITORING OF HETEROGENEOUS SMART LIGHTING SYSTEMS

(71) Applicant: Verizon Patent and Licensing Inc., Basking Ridge, NJ (US)

(72) Inventors: Attila Tomasovics, San Jose, CA (US); Harsha Viswanathan, New York, NY (US); Sambit Mishra, Fremont, CA (US); Karim Al-Khafaji, San Diego, CA (US); Alexander Shepel, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 644 days.

(21) Appl. No.: 17/159,915

(22) Filed: Jan. 27, 2021

(65) Prior Publication Data

US 2022/0240362 A1 Jul. 28, 2022

(51) Int. Cl.
*H05B 47/14* (2020.01)
*H05B 47/19* (2020.01)
*F21S 8/08* (2006.01)

(52) U.S. Cl.
CPC ............ *H05B 47/14* (2020.01); *H05B 47/19* (2020.01); *F21S 8/085* (2013.01)

(58) Field of Classification Search
None
See application file for complete search history.

(56) References Cited

U.S. PATENT DOCUMENTS 11,706,864 B1 * 7/2023 Mabry .................. H05B 47/11 315/130

* cited by examiner

*Primary Examiner* — Dedei K Hammond

(57) ABSTRACT

A system described herein may provide a technique for the automated detection of a particular type of lighting fixture, where a given type may refer to a particular make and/or model of the lighting fixture, bulb quantity, bulb technology, power output rating, etc. The detection may be based on measured dimming curves of the lighting fixture, which may indicate actual power consumption at varying brightness levels of the lighting fixture. One or more power consumption models may be selected, generated, and/or refined based on the measured dimming curves, and applied to other lighting fixtures sharing similar attributes and/or under similar conditions. Based on such models, a given lighting fixture may be able to automatically detect anomalous behavior (e.g., excessive power consumption or less power consumption compared to expected power consumption) and automatically take remedial actions.

20 Claims, 11 Drawing Sheets

400

| | Power consumption by brightness level | | | |
|---|---|---|---|---|
| **Fixture type** | 0% | 10% | 20% | 30% |
| Fixture_A | 0.2W | 2.0W | 3.8W | 5.9W |
| Fixture_B | 1.0W | 2.2W | 3.3W | 4.4W |
| Fixture_C | 0.0W | 4.7W | 9.4W | 14.0W |

● ● ●

FIG. 4

500

| Power consumption by ambient temperature | | | |
|---|---|---|---|
| 0-10° | 11-20° | 21-30° | 31-40° |
| *400-1* | *400-2* | *400-3* | *400-4* |

● ● ●

FIG. 5

600

| Power consumption by warm-up status | |
|---|---|
| During warm-up | After warm-up |
| *500-1* | *500-2* |

FIG. 6

SYSTEMS AND METHODS FOR DYNAMIC CONTROL AND MONITORING OF HETEROGENEOUS SMART LIGHTING SYSTEMS

BACKGROUND

Cities, municipalities, and the like may deploy lighting fixtures, such as street lamps, to provide lighting and safety on sidewalks, roadways, or other locations. Different types of lighting fixtures, such as fixtures of different makes and/or models, and/or using different types of bulbs, may consume different amounts of power when set to different brightness levels (e.g., sometimes referred to as "dimming"). Malfunctioning fixtures may consume more or less power than expected when set to a given brightness level, which may indicate an increase in the amount of power consumed and/or a reduction in light output.

BRIEF DESCRIPTION OF THE DRAWINGS

FIGS. 4-6 illustrate example data structures associated with one or more smart lighting fixture power consumption models, in accordance with some embodiments;

DETAILED DESCRIPTION OF EXAMPLE EMBODIMENTS

Figure 1:
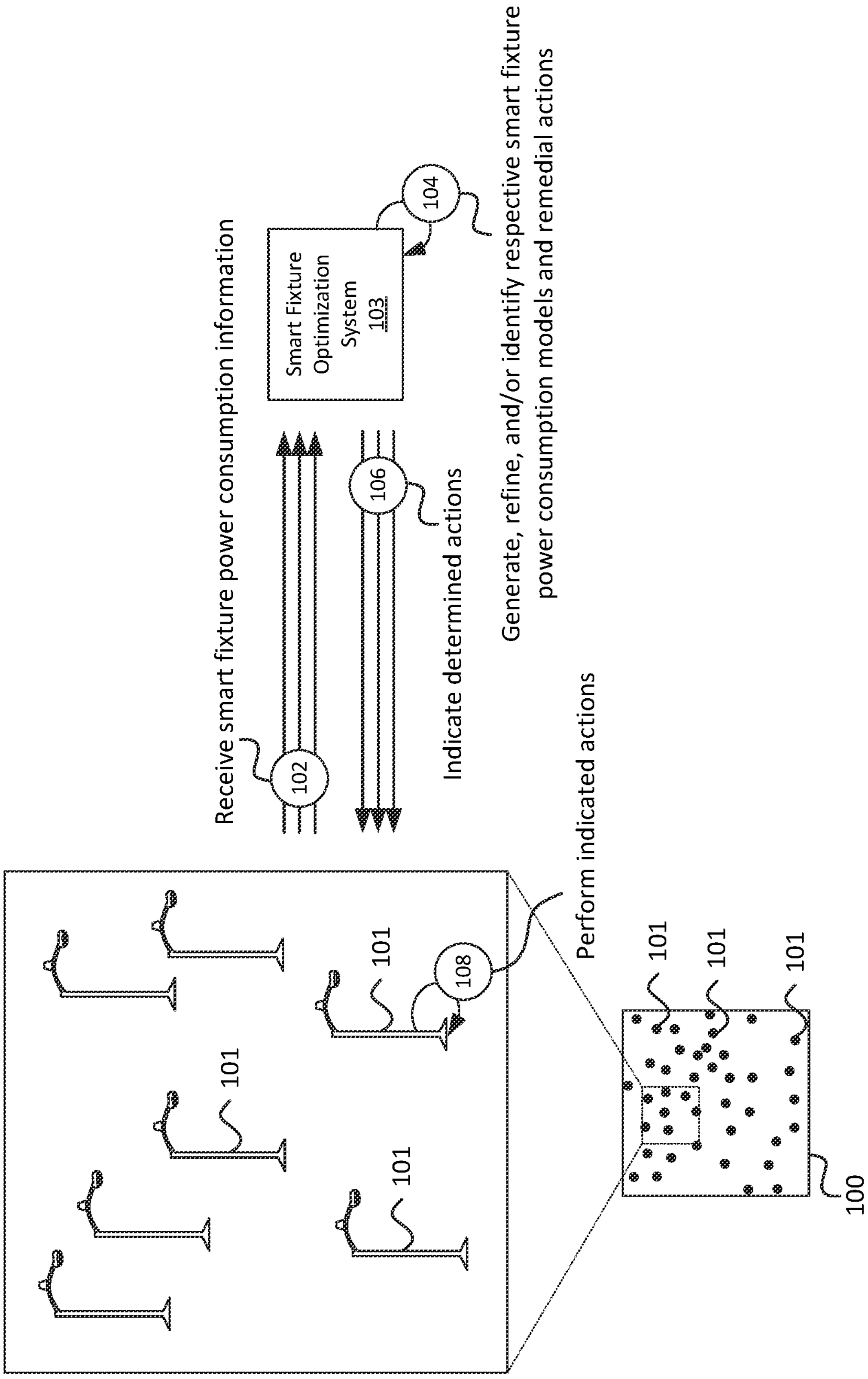
FIG. 1 illustrates an example overview of one or more embodiments described herein.

The following detailed description refers to the accompanying drawings. The same reference numbers in different drawings may identify the same or similar elements.

Embodiments described herein provide for the generation and/or refinement of models (e.g., using analytical techniques such as machine learning ("ML") techniques or other suitable techniques) that reflect nominal power consumption of various types of lighting fixtures at different brightness levels. For example, a smart lighting fixture of some embodiments may be "dimmable" and/or may otherwise be configurable, such that the amount of power delivered to a light output component of the smart lighting fixture (e.g., one or more bulbs, light-emitting diode ("LED") modules, etc.) is variable. Such "dimming" operations may be achieved by way of increasing or decreasing voltage, increasing or decreasing resistance, pulse width modulation, and/or other suitable operations. The rates of power consumed by a given lighting fixture at different brightness levels may be referred to herein as a "dimming curve." Different types of lighting fixtures may be associated with different dimming curves. For example, one type of lighting fixture may consume 10 Watts ("W") when set to a "10%" brightness level, while another type of lighting fixture may consume 20 W when set to the "10%" brightness level. Even among lighting fixtures of the same type, there may be variations in the performance of individual fixtures due to manufacturing variations, environmental variations, etc.

In accordance with some embodiments, the smart lighting fixture may perform an automatic calibration process to determine a dimming curve associated with the smart lighting fixture, which may include automatically setting a brightness level parameter associated with the smart lighting fixture to various brightness levels (e.g., 10%, 20%, 30%, etc.) and measuring respective power consumption metrics (e.g., instantaneous rate of power consumption, amount of power consumed over time, average amount or rate of power consumed in a given time period, etc.) associated with the various brightness levels. As further described herein, one or more smart fixture power consumption models (referred to herein simply as "consumption models") may be generated based on dimming curves received from multiple smart lighting fixtures. The models may be arranged, clustered, grouped, and/or otherwise differentiated in single or multiple dimensions, such as based on lighting fixture type (e.g., make, model, bulb output power rating, bulb technology, etc.), location (e.g., latitude and longitude coordinates, city, region, province, etc.), ambient conditions (e.g., ambient temperature, ambient light levels, radio frequency ("RF") signal levels, etc.), user or user group (e.g., an owner and/or operator associated with a given smart lighting fixture, such as a city, municipality, university, etc.), and/or other factors.

The consumption models may be used as predictive models to identify or categorize a given smart lighting fixture (e.g., a smart lighting fixture of unknown make, model, bulb type, etc.) based on measured consumption metrics (e.g., rates or amounts of power consumed at particular brightness levels) associated with the smart lighting fixture. In some embodiments, the consumption models may be used in system operation to analyze consumption metrics associated with a given smart lighting fixture to detect potential anomalies or other events, such as the consumption of greater or lesser amounts of power at particular brightness levels. In some embodiments, the consumption models may be used to identify particular remedial actions to perform in response to such events, such as modifying a brightness level, outputting an alert, and/or one or more other actions. The actions taken may be dependent on the amount of variation from the predicted performance of the consumption models. Accordingly, smart lighting fixtures of various types may be able to be automatically calibrated and configured in order to monitor consumption metrics, detect anomalies, and perform one or more remedial measures in response to detected anomalies.

As shown in FIG. 1, for example, a particular region 100 may include multiple smart lighting fixtures 101. Smart lighting fixtures 101 may be, for example, permanently affixed or mounted, semi-permanently affixed or mounted, and/or mobile devices located within region 100. Thus, while referred to herein as a "fixture," in some embodiments smart lighting fixture 101 may be, or may include, any suitable lighting device that performs operations described herein.

Smart lighting fixtures 101 may communicate (e.g., via one or more wired and/or more wireless networks) with Smart Fixture Optimization System ("SFOS") 103, to send and/or receive information as described herein. For example, one or more smart lighting fixtures 101 may output (at 102) consumption information associated with respective smart lighting fixtures 101 to SFOS 103. As discussed below, such consumption information may include rates and/or amounts of power consumption at different brightness levels, dimming curves, and/or other suitable information. In some embodiments, SFOS 103 may receive (e.g., from smart lighting fixtures 101 and/or one or more other devices or systems) attributes and/or parameters associated with smart lighting fixtures 101, such as location, fixture type (e.g., make and/or model, bulb technology (e.g., incandescent, LED, or the like), bulb output power rating, etc.), ambient temperature corresponding to times at which consumption metrics are measured, and/or other attributes or parameters.

As described herein, smart lighting fixtures 101 may provide (at 102) consumption information as part of an automatic calibration process and/or at some other time, such as on an ongoing, continuous, periodic, intermittent, and/or event-based basis. SFOS 103 may generate, refine, and/or determine (at 104) one or more consumption models based on the received information. For example, SFOS 103 may perform a "training" or model generation operation, in which the received information is aggregated, clustered, categorized, etc., based on one or more attributes or parameters, and consumption models may be generated based on the aggregated, clustered, categorized, etc. information.

For example, as discussed below, a first consumption model may be associated with a first type of smart lighting fixture 101 (e.g., a fixture having a 100 W incandescent bulb) while a second consumption model may be associated with a second type of smart lighting fixture 101 (e.g., a fixture having a pair of 40 W LED modules). As another example, a third consumption model may be based on a particular smart lighting fixture 101 in a first set of ambient conditions (e.g., an ambient temperature of 30 degrees Fahrenheit) and a fourth consumption model may be based on the same smart lighting fixture 101 (and/or one or more other smart lighting fixtures 101 having the same or similar attributes) in a second set of ambient conditions (e.g., an ambient temperature of 70 degrees Fahrenheit). In some embodiments, the consumption models may be multi-dimension, in that a fifth example consumption model may be based on the first and third consumption models, a sixth consumption model may be based on the first and fourth consumption models, a seventh consumption model may be based on the second and third consumption models, and an eighth consumption model may be based on the second and fourth consumption models. Similarly, other consumption models may be based on one or more (e.g., a single or multiple) sets of attributes or parameters of smart lighting fixtures 101.

In some embodiments, smart lighting fixture 101 may provide consumption information as part of an identification or categorization process associated with smart lighting fixture 101. For example, smart lighting fixture 101 may provide rates and/or amounts of power consumption associated with smart lighting fixture 101 at different brightness levels to SFOS 103, SFOS 103 may identify one or more matching consumption models (e.g., using analytical techniques such as regression, K-means clustering, and/or some other suitable similarity analysis) to determine that the consumption information associated with smart lighting fixture 101 matches (e.g., has a measure of similarity exceeding a threshold measure of similarity) a particular consumption model.

In some embodiments, particular consumption models may be associated with particular remedial actions for particular types of anomalies and/or events. Such actions may have been determined using AI/ML techniques (e.g., using supervised learning, unsupervised learning, and/or other suitable techniques) to identify particular remedial actions that resolved particular types of anomalies and/or events in the past. For example, one particular consumption model may be associated with a first type of anomaly (e.g., rate of power consumption at a 10% brightness level exceeds an expected rate of power consumption by 50%) and a second type of anomaly (e.g., rate of power consumption at the 10% brightness level exceeds the expected rate of power consumption by 100%). The first type of anomaly for the particular consumption model may be associated with a first remedial action (e.g., output an alert to/from SFOS 103 and/or some other device or system), while the second type of anomaly may be associated with a second remedial action (e.g., reduce the brightness level to 5%, reduce the brightness level to a level that corresponds to a particular rate or amount of power consumed, shut off power to a light output component of smart lighting fixture 101, and/or some other suitable action).

In some embodiments, SFOS 103 may output (at 106), to each smart lighting fixture 101, information indicating the identified consumption model and/or remedial action(s) associated with each respective smart lighting fixture 101. Smart lighting fixtures 101 may monitor rates and/or amounts of power consumption, dimming curves, and/or other metrics based on the received consumption models. Based on the consumption models and/or actions, smart lighting fixture 101 may automatically perform (at 108) one or more remedial actions in situations where smart lighting fixture 101 identifies, based on the monitoring, that one or more anomalies and/or events have occurred. In some implementations, SFOS 103 may use the identified consumption model to detect anomalous conditions at fixture 101 from requested and/or periodic reporting by fixture 101 of its operational metrics.

Figure 2:
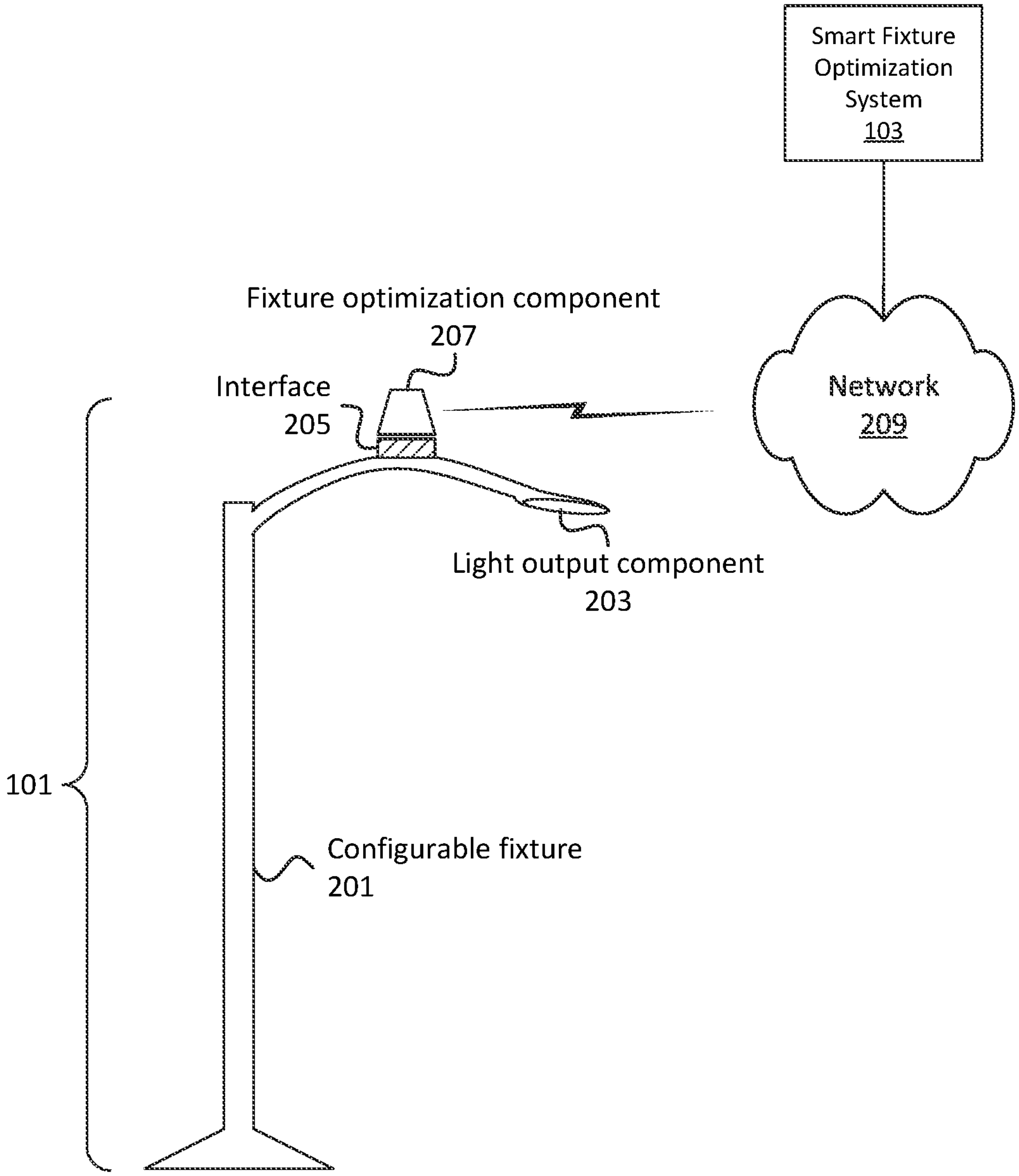
FIG. 2 illustrates example components of a smart lighting fixture, in accordance with some embodiments.

FIG. 2 illustrates example components of smart lighting fixture 101. As shown, smart lighting fixture 101 may include configurable fixture 201, light output component 203, interface 205, and Fixture Optimization Component ("FOC") 207. Configurable fixture 201 may include and/or may receive power (e.g., electrical power) from an external source, such as a transformer, a solar panel, or the like. Configurable fixture 201 may provide power to light output component 203 and to FOC 207 (e.g., via interface 205). Light output component 203 may include one or more bulbs (e.g., LED bulbs, incandescent bulbs, fluorescent bulbs, etc.) or other light output components. In some embodiments, interface 205 and/or FOC 207 may include a controller, a relay, a dimmer, a switch, or some other suitable component to control (e.g., power on, power off, set brightness level, etc.) light output component 203. For example, FOC 207 may (e.g., via interface 205) provide an instruction or indication of a given brightness level, and light output component 203 may increase or decrease an amount of voltage provided to a bulb, LED module, etc. of light output component 203 based on the indicated brightness level.

Interface 205 may include an interface that may receive control signals (e.g., to control the brightness level of light output component 203, to perform dimmer operations with respect to light output component 203, etc.) or other suitable types of information from FOC 207. Further, in some embodiments, interface 205 may be or may include a physical interface, such as an American National Standards Institute ("ANSI") C136.41 dimming receptacle and/or some other suitable type of physical interface via which FOC 207 can be communicatively coupled to light output component 203.

FOC 207 may include wireless communication circuitry, such that FOC 207 may communicate wirelessly, via network 209, with SFOS 103. For example, network 209 may be, or may include, a radio access network ("RAN") of a wireless network, such as a Long-Term Evolution ("LTE") RAN, a Fifth Generation ("5G") RAN, and/or some other suitable type of RAN. Additionally, or alternatively, FOC 207 may include wired communication circuitry to communicate with SFOS 103 via one or more wired networks (e.g., a wired portion of network 209).

In some embodiments, FOC 207 may include one or more sensors, such as an illuminance sensor, a microphone, a motion detection sensor, a pressure sensor, a particulate matter (e.g., PM2.5) sensor, a location detection component (e.g., Global Positioning System ("GPS") circuitry), a thermometer, a barometer, and/or other suitable sensors and/or components. In the description herein, some or all of the operations discussed with respect to smart lighting fixture 101 may be performed by FOC 207. In some embodiments, such operations may be performed by FOC 207 in conjunction with configurable fixture 201, light output component 203, and/or interface 205. For example, when smart lighting fixture 101 is described herein as modifying a brightness level of smart lighting fixture 101, such brightness level may be modified by FOC 207 outputting one or more suitable signals to or via interface 205, in order to control a brightness level of light output component 203. As another example, when smart lighting fixture 101 is described herein as determining a rate or amount of power consumption with respect to smart lighting fixture 101, FOC 207 may determine such power consumption metrics based on an amount of power consumed by light output component 203 via interface 205, and/or interface 205 may provide such power consumption metrics to FOC 207.

FOC 207 may be configured to provide periodic reporting of its operations to SFOS 103 over network 209. FOC 207 may also be configured to receive instructions from SFOS 103 over network 209 to perform various actions such as described above—adjust brightness levels, reduce power consumption—as well report its operational metrics, such as sensor readings (ambient temperature, light output component temperature, illuminance) and other status. FOC 207 may be configured to report its operational metrics as a "batch" or "aggregation" of metrics collected over time. For example, FOC 207 may collect measurements on a first periodic basis (e.g., a per-minute basis, a per-hour basis, or on some other basis), and report the collection of measurements on a second periodic basis (e.g., on a daily basis, every two days, or on some other basis) in a single reporting action.

Figure 3A:
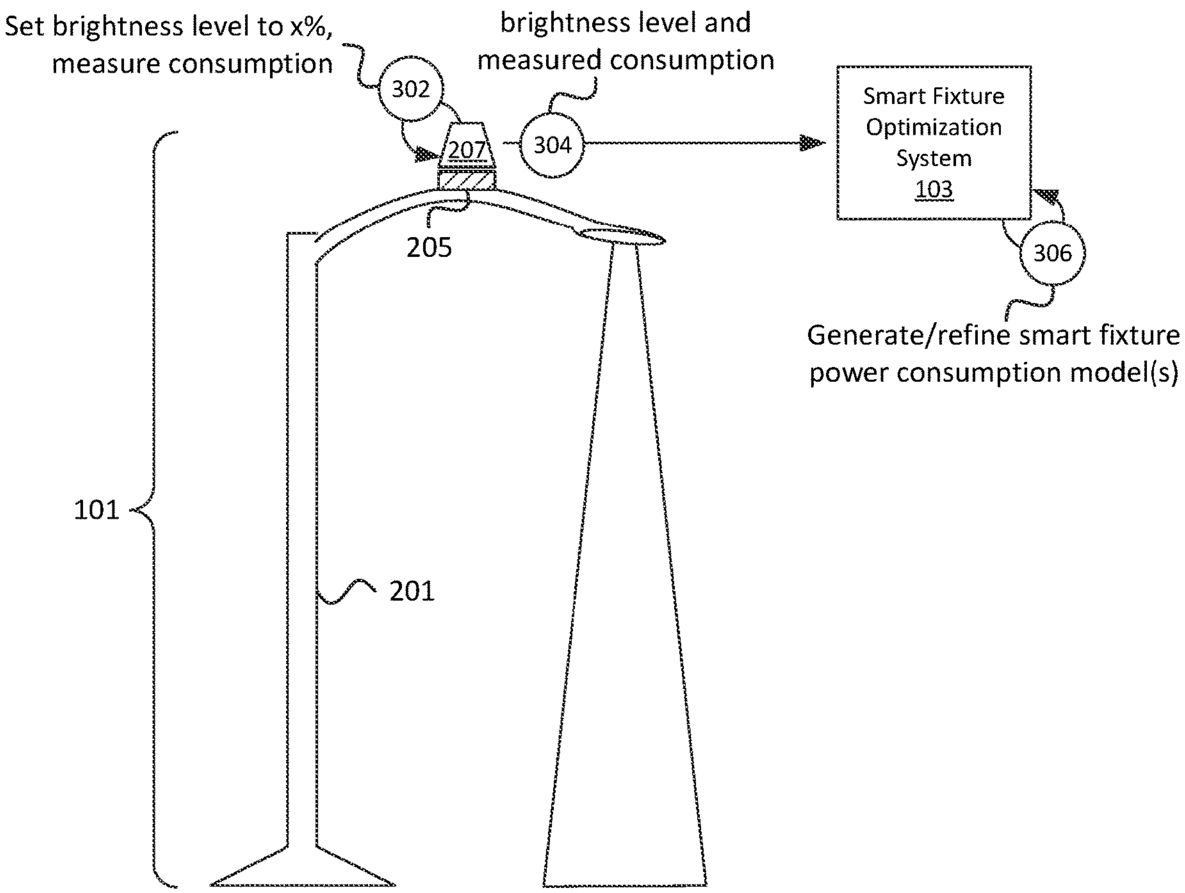
FIGS. 3A and 3B illustrate an example automatic calibration process of a smart lighting fixture, in accordance with some embodiments.

As discussed above, smart lighting fixture 101 may perform an automatic calibration procedure, in order to assist in the generation of one or more consumption models, and/or to identify or categorize smart lighting fixture 101 based on one or more existing consumption models. In some implementations, the automatic calibration procedure may be triggered by SFOS 103—for example, by sending an instruction to fixture 101 to perform the calibration procedure. For example, as shown in FIG. 3A, smart lighting fixture 101 may set (at 302) a brightness level to a first brightness level (shown in the figure as x %, which may be 0%, 10%, 20%, or some other brightness level), and may measure an amount of power consumed over a given amount of time (e.g., in terms of Watt-hours or some other suitable unit), and/or may measure a rate of power consumption (e.g., in terms of Watts or some other suitable unit). For example, as mentioned above, FOC 207 may compute the consumption metrics based on signals received from interface 205, and/or may receive the consumption metrics from interface 205. In some embodiments, as also mentioned above, FOC 207 may determine one or more other attributes associated with smart lighting fixture 101 and/or other conditions corresponding to a time at which the consumption metrics were measured. For example, FOC 207 may determine an ambient temperature, an ambient audible sound level, an amount of RF interference or noise, a measure of detected motion, a temperature of light output component 203, and/or other types of sensor data at the time corresponding to when the consumption metrics were measured.

Smart lighting fixture 101 may output (at 304) the consumption metrics, as well as the brightness level at which smart lighting fixture 101 was set when the consumption metrics were measured (i.e., x %, in this example), to SFOS 103. In some embodiments, smart lighting fixture 101 may output some or all of the other sensor information measured at the time at which the consumption metrics were measured. In other embodiments, the measurements may be stored locally at the fixture 101, and provided at a later time as part of a "batch" transmission of measurements.

Based on the received information, SFOS 103 may generate and/or refine (at 306) one or more consumption models. For example, SFOS 103 may identify whether any existing consumption models match the received consumption metrics. For example, SFOS 103 may identify whether consumption models exist for smart lighting fixtures 101 having the same or similar (e.g., within a threshold measure of similarity, using a suitable similarity or correlation analysis) attributes as smart lighting fixture 101. In situations where SFOS 103 does not identify an existing matching consumption model, SFOS 103 may generate (at 306) a new consumption model for smart lighting fixture 101, based on the attributes of smart lighting fixture 101 and the received consumption information (e.g., the rate and/or amount of consumption when smart lighting fixture 101 is set to a brightness level of x %). In situations where SFOS 103 identifies an existing matching consumption model, SFOS 103 may refine the existing consumption model based on the received consumption metrics. For example, SFOS 103 may aggregate the received consumption metrics with previously received consumption metrics associated with the matching consumption model. Such aggregation may include performing an averaging operation, generating one or more "best fit" lines or curves, performing a regression analysis, identifying and removing outliers, and/or other suitable operations.

Figure 3B:
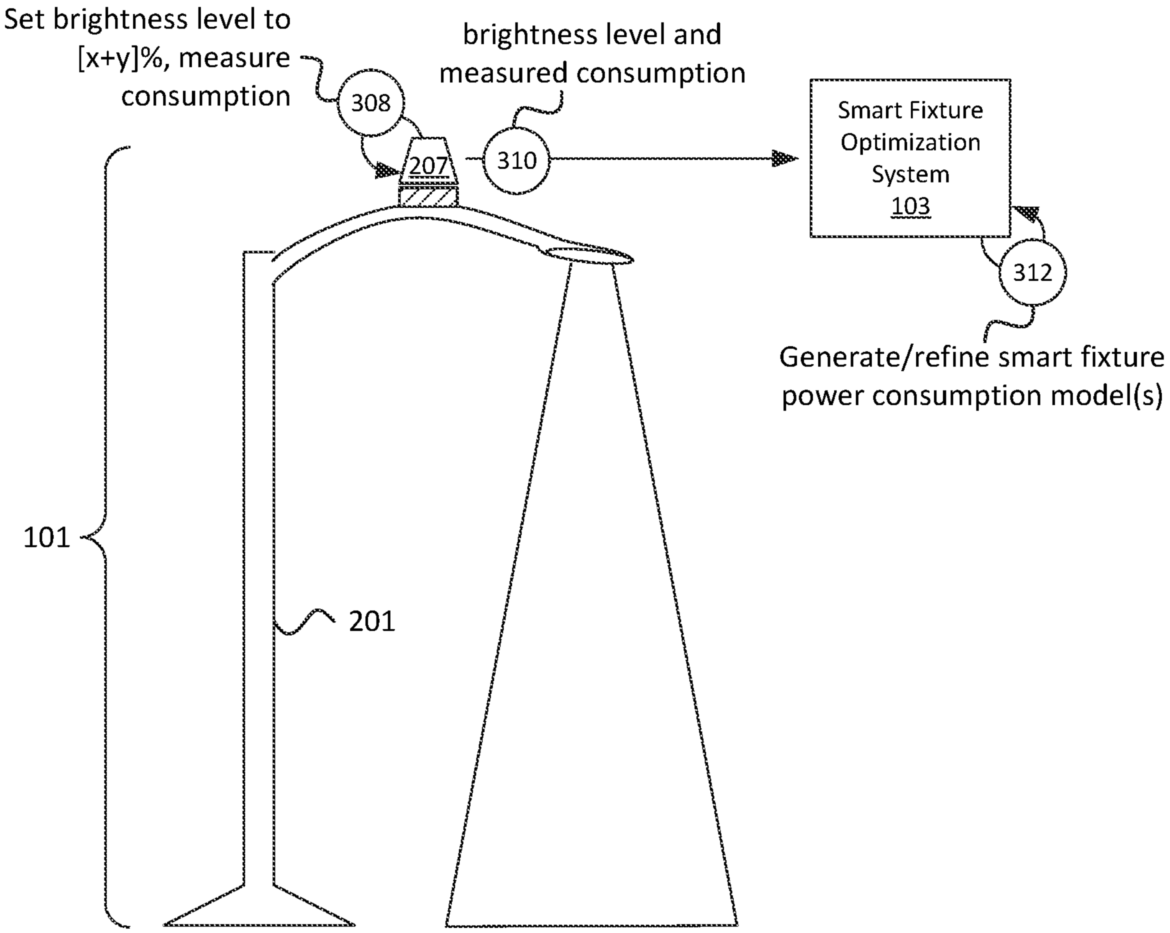

Some or all of the operations shown in FIG. 3A may be performed repeatedly and/or iteratively, in order to identify consumption metrics at different brightness levels and/or when smart lighting fixture 101 experiences varying conditions (e.g., varying ambient temperatures, varying RF channel conditions, etc.). For example, as shown in FIG. 3B, smart lighting fixture 101 may set (at 308) the brightness level of smart lighting fixture 101 to [x+y]%, which may be a different brightness level than shown in the example of FIG. 3A. FOC 207 may determine or receive consumption metrics associated with smart lighting fixture 101 at this brightness level (as well as other suitable sensor data, as discussed above), and may output (at 310) the consumption metrics and sensor data, in some embodiments, to SFOS 103. As similarly discussed above, SFOS 103 may generate and/or refine (at 312) one or more consumption models based on the received consumption metrics.

In some embodiments, similar operations as shown above with respect to FIGS. 3A and 3B may be iteratively performed multiple times (e.g., brightness level set to [x+2*y] %, [x+3*y]%, [x+4*y]%, and so on), in order to generate or determine a dimming curve associated with smart lighting fixture 101. As one example, smart lighting fixture 101 may set the brightness level to 0%, then 10%, then 20%, then 30%, and so on, and measure rates and/or amounts of consumption at each of these brightness levels. As another example, smart lighting fixture 101 may gradually or continuously increase or decrease brightness levels, and may measure rates and/or amounts of consumption at varying brightness levels (e.g., on a sliding scale). In some embodiments, similar operations as shown above with respect to FIGS. 3A and 3B may be performed at the same brightness level, but with differing conditions (e.g., different ambient temperature, different temperature of light output component 203, different time of day, etc.), and one or more consumption models may be generated or refined based on the additional consumption metrics. In this manner, SFOS 103 may be able to generate consumption models that model consumption at varying conditions, and/or may be able to generate multi-dimensional consumption models (e.g., as noted above).

FIGS. 4-6 illustrate example data structures that may correspond to particular consumption models generated, maintained, refined, etc. by SFOS 103. For example, data structure 400 indicates rates of consumption by different fixture types at different brightness levels. That is, data structure 400 may indicate dimming curves on the basis of different fixture types, shown as example types "Fixture_A," "Fixture_B," and "Fixture_C." As noted above, the different "types" may correspond to different makes and/or models of fixtures, different power output ratings of bulbs associated with such fixtures, and/or other differentiating attributes of fixtures. The values reflected in data structure 400 may be aggregated values based on values collected from multiple fixtures over time. For example, the aggregated values may be averages, means, and/or other computed values derived from raw consumption metrics. In some embodiments, the aggregated values may be generated by eliminating outliers (e.g., where outlier data may be received from malfunctioning fixtures), determining one or more "best fit" curves, and/or other suitable operations to determine the appropriate rates of consumption at varying brightness levels on a per-fixture basis.

While shown in the figure as single values (e.g., 0.2 W at a 0% brightness level for Fixture_A), the values in data structure 400 may in some embodiments include one or more ranges, probability curves, and/or other sets of values. For example, in practice, the values for Fixture_A at the 0% brightness level may be 0.1 W-0.2 W or some other range of values.

FIG. 5 illustrates an example multi-dimensional data structure 500 in accordance with some embodiments. Data structure 500 may, for example, reflect dimming curves for multiple fixture types under multiple different conditions (e.g., in different ambient temperature ranges). As shown, each example temperature range (e.g., 0-10 degrees, 11-20 degrees, etc.) may be associated with a particular instance of data structure 400. For example, the temperature range of 0-10 degrees may be associated with a first instance 400-1 of data structure 400. Thus, data structure 500 may include dimming curves for Fixture_A, Fixture_B, and Fixture_C (e.g., instance 400-1 of data structure 400) measured in ambient temperatures (e.g., as measured by respective FOCs 207 or by respective suitable devices communicatively coupled FOCs 207) between 0 and 10 degrees Celsius. As further shown, data structure 500 may include instance 400-2 of data structure 400 for another range of ambient temperatures (e.g., 11-20 degrees Celsius). Thus, data structure 500 may also include dimming curves for Fixture_A, Fixture_B, and Fixture_C (e.g., instance 400-2 of data structure 400) measured in ambient temperatures between 11 and 20 degrees Celsius. Similarly, data structure 500 may include dimming curves for these fixtures measured in ambient temperatures between 21-30 degrees Celsius, 31-40 degrees Celsius (e.g., instances 400-3 and 400-4 of data structure 400, respectively), and so on.

While FIG. 5 uses ambient temperature as an example, in practice, other types of conditions may be reflected in data structure 500 (or some other suitable data structure). For example, dimming curves for different fixtures may be reflected on a temporal basis (e.g., at different times of the day, different days of the week, etc.). As another example, dimming curves for different fixtures may be indicated based on RF metrics determined by respective FOCs 207 (e.g., Signal-to-Interference-and-Noise-Ratio ("SINR") values, Reference Signal Received Power ("RSRP") values, antenna received power values, and/or other RF metrics). In some embodiments, dimming curves for different fixtures may be indicated based on RF configuration parameters associated with respective FOCs 207 (e.g., power save mode, radio access technology ("RAT"), quantity of antennas, Multiple-Input Multiple-Output ("MIMO") configuration parameters, and/or other RF configuration parameters). As yet another example, dimming curves for different fixtures may be indicated based on atmospheric pressure levels, altitude, location, ambient sound levels, ambient light levels, and/or other conditions.

FIG. 6 illustrates a further example of multi-dimensional modeling based on which one or more consumption models may be generated, in accordance with some embodiments. For example, data structure 600 may indicate dimming curves based on warm-up status. Fixtures may, for example, be associated with a "warm-up" procedure and/or a "warm-up" time. The warming up of a particular smart lighting fixture 101 may refer to the powering up of smart lighting fixture 101 from a "cold" status, such as the first time that smart lighting fixture 101 is powered up after having been powered off for at least a threshold amount of time (e.g., one hour, six hours, etc.). Generally, the dimming curves for various smart lighting fixtures 101 at different times in relation to the warm-up procedure (e.g., during warm-up or after warm-up) may be different. Further, the dimming curves for various smart lighting fixtures 101, in different ambient temperatures (or other conditions) at different times in relation to the warm-up procedure (e.g., during warm-up or after warm-up) may be different. Thus, for example, a first instance 500-1 of data structure 500 may reflect dimming curves, on a per-temperature (and/or other conditions) and per-fixture basis while such fixtures are undergoing a warm-up procedure, while a second instance 500-2 of data structure 500 may reflect dimming curves, on a per-temperature and per-fixture basis after such fixtures have completed a warm-up procedure.

Figure 7:
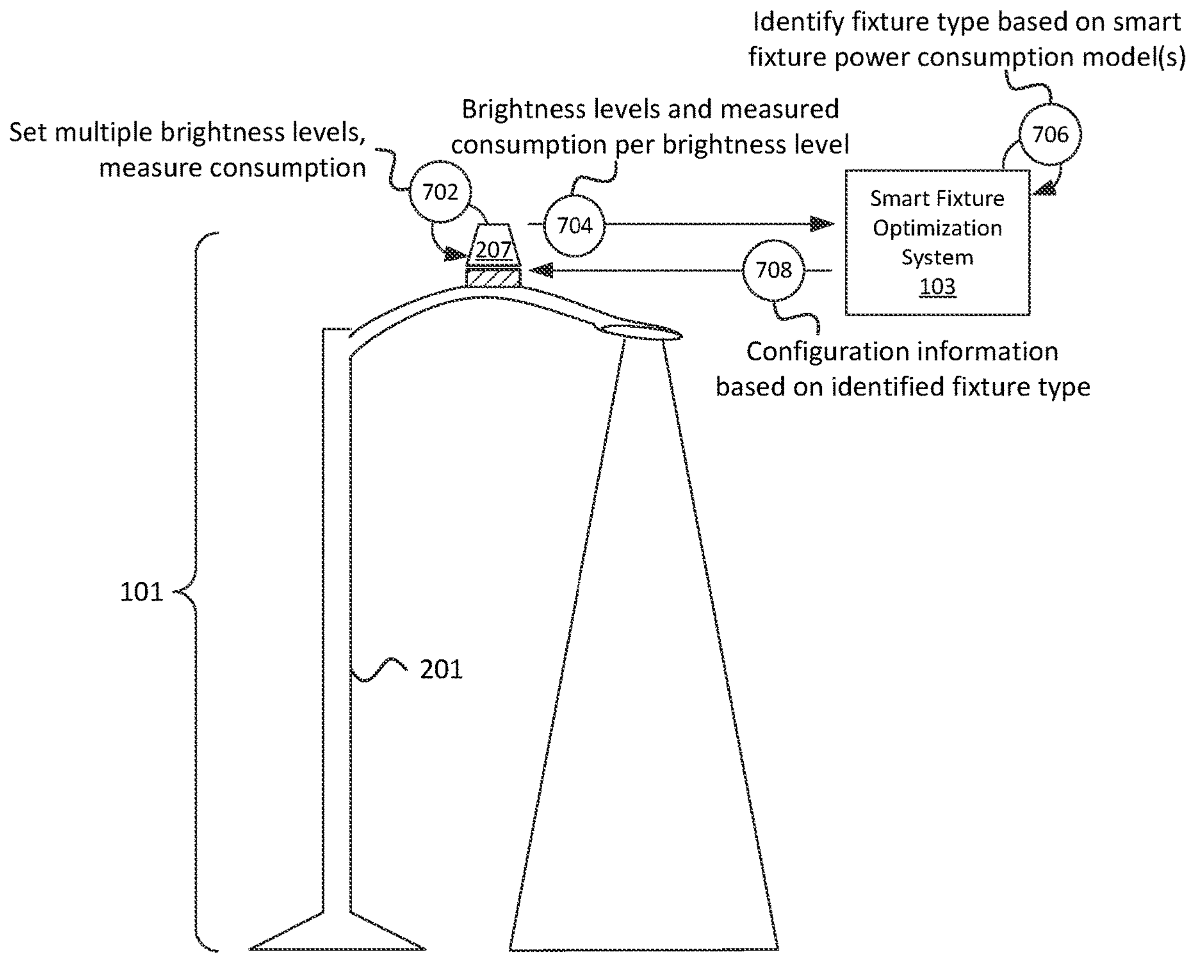
FIG. 7 illustrates the configuration of a given smart lighting fixture based on an evaluation of measured power consumption values associated with the smart lighting fixture and one or more smart lighting fixture power consumption models, in accordance with some embodiments.

As mentioned above, consumption models (e.g., which may include and/or be based on data structures 400, 500, 600, and/or other suitable information) may be used to identify particular fixtures or fixture types, and respective FOCs 207 may be able to be configured based on appropriate dimming curves (e.g., to detect anomalies or other events based on consumption models for the identified fixture types). For example, as shown in FIG. 7, smart lighting fixture 101 (e.g., FOC 207) may set (at 702) multiple brightness levels for smart lighting fixture 101, and may measure rates and/or amounts of consumption at such brightness levels. In some embodiments, smart lighting fixture 101 (e.g., FOC 207) may further measure one or more other conditions (e.g., ambient temperature, ambient light, RF metrics, warm-up status, etc.), as discussed above. Smart lighting fixture 101 (e.g., FOC 207) may further output (at 704) the measured rates and/or amounts of consumption at respective brightness levels, along with any other suitable information (e.g., ambient temperature, ambient light, etc.) to SFOS 103.

SFOS 103 may identify (at 706) a fixture type associated with smart lighting fixture 101 based on the received information. For example, SFOS 103 may compare the received information to one or more consumption models and may perform a suitable similarity or correlation analysis to identify a particular consumption model that matches the received information. For example, SFOS 103 may identify one or more dimming curves that match (e.g., exactly match, and/or have a measure of similarity that exceeds a threshold measure of similarity) a dimming curve reflected by the information received (at 704) from smart lighting fixture 101. In some embodiments, as noted above, the dimming curve associated with the identified consumption model may include a range of values at one or more brightness levels, where such ranges may indicate "acceptable" or "normal" consumption at such brightness levels. As noted above, particular consumption models may be associated with particular remedial actions, which may be identified using AI/ML techniques or other suitable techniques. SFOS 103 may further identify such actions when identifying a consumption model for smart lighting fixture 101 based on received (at 704) consumption information from smart lighting fixture 101.

In some embodiments, SFOS 103 may output (at 708) configuration information for smart lighting fixture 101 based on an identified fixture type and/or consumption model for smart lighting fixture 101. For example, such configuration information may include one or more dimming curves associated with smart lighting fixture 101 (e.g., multi-dimensional dimming curves, dimming curves for different conditions, etc.). That is, while smart lighting fixture 101 may measure (at 702) consumption amounts or rates under one set of conditions (e.g., with a particular ambient temperature, during a particular time of day, etc.), the configuration information may include consumption models for the same fixture type, but under different conditions (e.g., different ambient temperatures, during different times of day, etc.). In some implementations, the consumption model may be output to fixture 101 for use in monitoring the performance of fixture 101.

Figure 8:
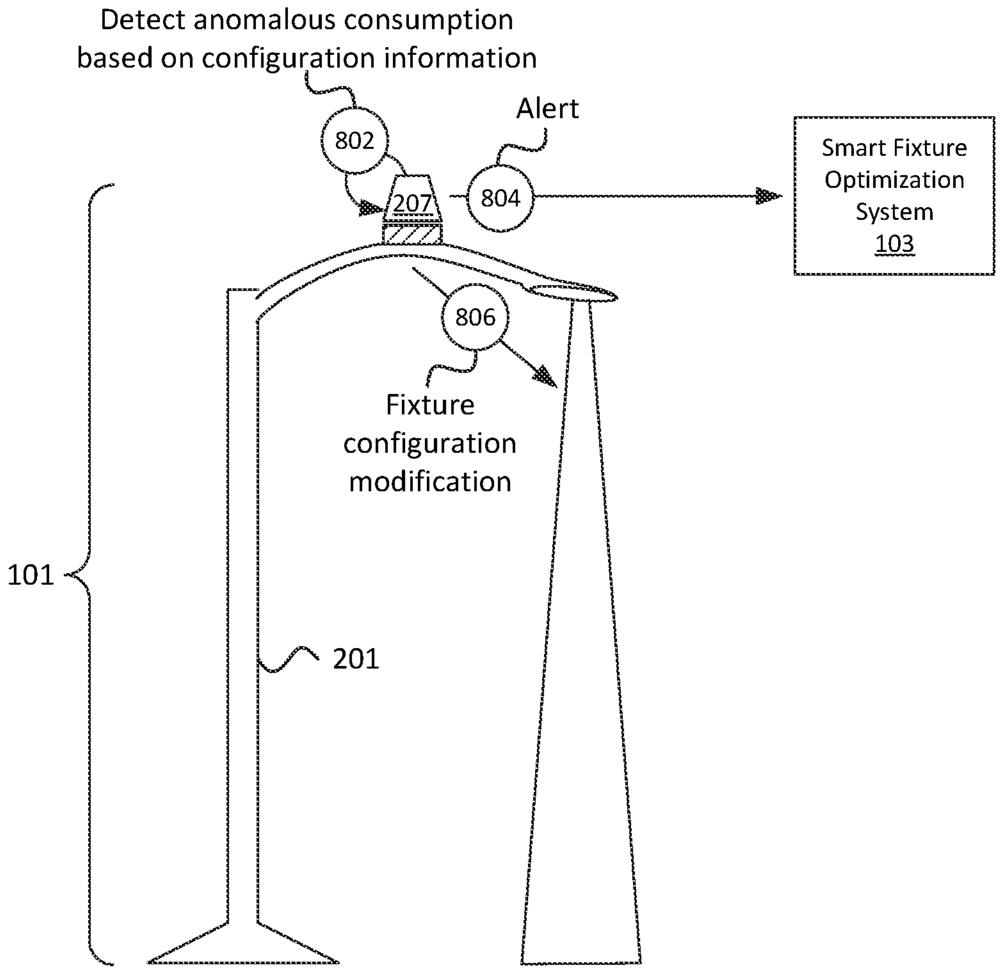
FIG. 8 illustrates the example performance of one or more remedial actions based on monitoring of power consumption values associated with a smart lighting fixture, in accordance with some embodiments

As shown in FIG. 8, for example, smart lighting fixture 101 may detect (at 802) an anomalous level (e.g., rate and/or amount of consumption) associated with smart lighting fixture 101 based on the received configuration information. As one example, smart lighting fixture 101 may detect that smart lighting fixture 101 is consuming a greater or lesser rate or amount of power than an expected rate or amount (e.g., where the "expected" rate or amount is based on values associated with a respective consumption model associated with smart lighting fixture 101). In some embodiments, the anomalous consumption (at 802) may be detected under different conditions (e.g., different ambient temperature conditions, different ambient light conditions, etc.) than consumption metrics measured by smart lighting fixture 101 (e.g., at 702). In this manner, the consumption models determined (e.g., at 706) may be used in a predictive manner, in order to identify dimming curves for smart lighting fixture 101 in conditions that differ from conditions in which smart lighting fixture 101 measured consumption metrics during an identification process (e.g., at 702).

Based on detecting (at 802) an anomalous condition, smart lighting fixture 101 (e.g., FOC 207) may output (at 804) an alert to SFOS 103 and/or some other device or system. The alert may indicate, for example, that smart lighting fixture 101 is consuming more power or less power than an "expected" consumption rate or amount. In some embodiments, the alert may indicate how far above or below the expected consumption is being measured by smart lighting fixture 101. In some embodiments, the alert may indicate other information, such as an ambient temperature at the time the anomalous consumption was detected (at 802), an ambient light level at such time, and/or other suitable information (e.g., as measured or detected by one or more sensors or other devices or systems associated with smart lighting fixture 101).

In some embodiments, smart lighting fixture 101 may modify (at 806) one or more configuration parameters associated with smart lighting fixture 101 based on the detected anomalous consumption. In some embodiments, such modifications may be indicated by SFOS 103 (e.g., at 708). For example, smart lighting fixture 101 may modify a brightness level associated with smart lighting fixture 101 based on the detected anomalous consumption, such as by increasing or decreasing the brightness level. For example, in scenarios where smart lighting fixture 101 measures a greater consumption rate than expected for a given brightness level, smart lighting fixture 101 may reduce the brightness level. In some embodiments, smart lighting fixture 101 may identify the expected consumption rate for the brightness level associated with the anomalous consumption (e.g., as indicated by one or more consumption models), and may modify (at 806) the brightness level such that the actual consumption rate (after the modification at 806) matches (e.g., exactly matches, or matches within a threshold margin) the expected consumption rate.

In some embodiments, anomalous consumption may be detected and/or remediated via one or more other suitable techniques (e.g., in addition to or in lieu of the example techniques described above with respect to FIGS. 8 and 9). For example, in some embodiments, SFOS 103 may monitor (e.g., from smart lighting fixture 101, from FOC 207, and/or one or more other devices or systems) consumption metrics associated with smart lighting fixture 101 on a periodic basis, an intermittent basis, and/or some other basis. For example, in some embodiments, smart lighting fixture 101 (e.g., FOC 207) may "push" consumption metrics to smart lighting fixture 101 every minute, every hour, and/or on some other basis. For example, as noted above, such consumption metrics may be sent as a "batch" or as aggregated information. Additionally, or alternatively, SFOS 103 may "pull" (e.g., request, poll, etc.) consumption metrics from smart lighting fixture 101 on a periodic basis, an intermittent basis, and/or some other basis. SFOS 103 may, based on the monitored consumption metrics (e.g., as "pushed" or "pulled" from smart lighting fixture 101 and/or FOC 207) detect anomalous consumption associated with smart lighting fixture 101, may determine an appropriate action to remediate such anomalous consumption (e.g., modifying a brightness level, cutting power to light output component 203, etc.), and may instruct smart lighting fixture 101 (e.g., FOC 207) to implement such action.

In some implementations, when anomalous consumption is detected, SFOS 103 may compare the consumption metrics to other stored consumption models, and may determine that a different consumption model is a better fit (e.g., more closely matches, has a higher measure of similarity or correlation, etc.) than the consumption model currently associated with smart lighting fixture 101. For example, the SFOS 103 may output an alert regarding the anomalous consumption, where such alert includes an indication that the consumption metrics more closely fit a consumption model associated with a different type of smart lighting fixture 101.

For example, a user may have provided information (e.g., via a configuration process, a calibration process, an installation process, etc.) that indicates that smart lighting fixture 101 is a first type (e.g., a first make and/or model), and SFOS 103 may evaluate consumption metrics associated with smart lighting fixture 101 based on a particular consumption model associated with the first type (e.g., the first make and/or model). In some scenarios, SFOS 103 may determine that the consumption metrics associated with smart lighting fixture 101 more closely match a consumption model associated with a second type (e.g., a different second make and/or model), and may output an alert, prompt, or other message indicating the second type (e.g., the second make and/or model). SFOS 103 may receive an indication confirming that smart lighting fixture 101 is the second type (e.g., not the first type, as previously indicated), and may evaluate smart lighting fixture 101 based on a consumption model associated with the second type, in lieu of evaluating smart lighting fixture 101 based on the consumption model associated with the first type. In this manner, misclassification of smart lighting fixtures 101 (e.g., based on erroneous user input or other potential errors) may be remediated in an automated fashion.

Figure 9:
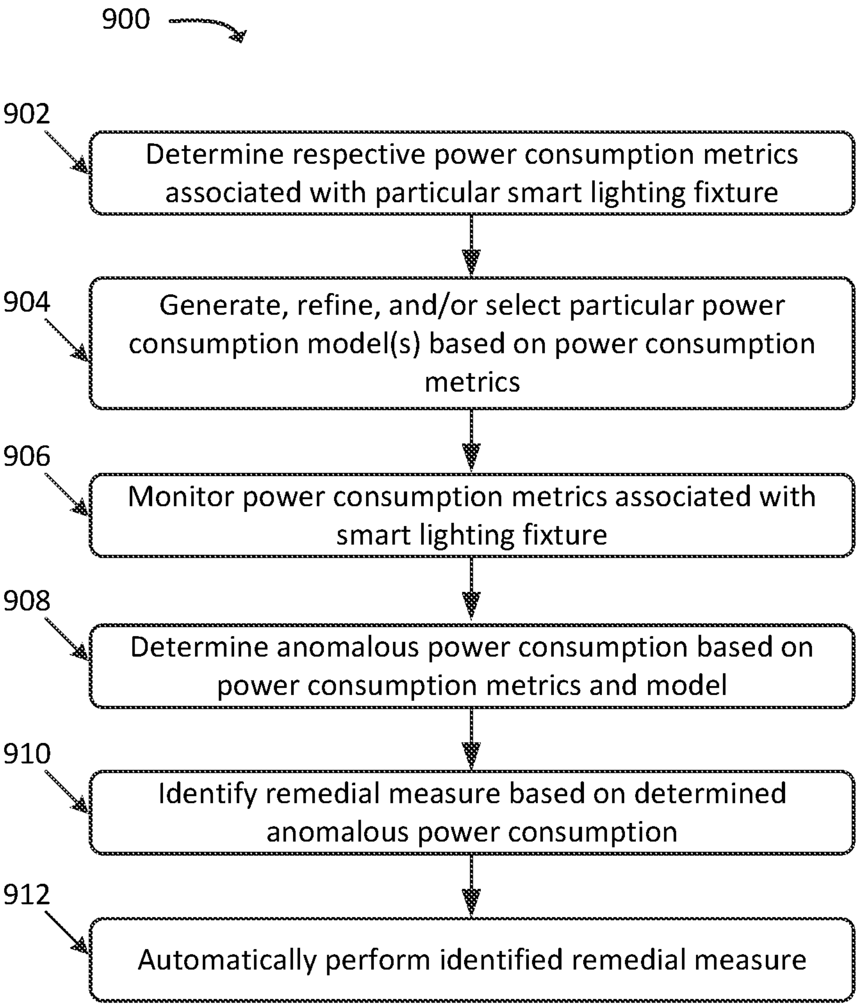
FIG. 9 illustrates an example process for generating, refining, etc. consumption models and using such models to detect and remediate anomalous consumption with respect to one or more smart lighting fixtures, in accordance with some embodiments.

FIG. 9 illustrates an example process 900 for generating, refining, utilizing, etc. consumption models and using such models to detect and remediate anomalous consumption with respect to one or more smart lighting fixtures 101. In some embodiments, some or all of process 900 may be performed by SFOS 103. In some embodiments, one or more other devices may perform some or all of process 900 in concert with, and/or in lieu of, SFOS 103 (e.g., FOC 207).

As shown, process 900 may include determining (at 902) respective power consumption metrics associated with a particular smart lighting fixture 101. For example, SFOS 103 may receive, from a particular smart lighting fixture 101 (e.g., from FOC 207) power consumption metrics (e.g., rates and/or amounts of power consumption) associated with smart lighting fixture 101. For example, as discussed above, FOC 207 may set (e.g., via interface 205) a brightness level associated with configurable fixture 201 to affect the amount of power provided to (e.g., by way of performing a "dimming" operation) light output component 203, which may affect the power output of smart lighting fixture 101 (e.g., amount or rate of power consumed by light output component 203). FOC 207 may determine the power consumption associated with smart lighting fixture 101 (e.g., the power consumed by light output component 203) at varying brightness levels.

Process 900 may further include generating, refining, and/or selecting (at 904) one or more power consumption models based on the power consumption metrics. For example, as discussed above, SFOS 103 may identify a previously generated power consumption model based on the received power consumption metrics. For example, SFOS 103 may identify a "matching" power consumption model, where such "match" may be determined based on a suitable similarity or correlation analysis of attributes of the power consumption metrics and attributes of the consumption models, as discussed above.

Process 900 may additionally include monitoring (at 906) power consumption metrics associated with smart lighting fixture 101. For example, FOC 207 may monitor the metrics based on the selected model, and/or may provide such metrics to SFOS 103. FOC 207 and/or SFOS 103 may compare the received metrics (e.g., on an ongoing basis or some other basis) to the selected consumption model. As noted above, a given consumption model may include different dimming curves or other information for varying attributes or conditions, such as different ambient temperatures, ambient lighting conditions, etc.

Process 900 may also include determining (at 908) anomalous power consumption associated with smart lighting fixture 101 based on the consumption metrics and the consumption model. For example, FOC 207 and/or SFOS 103 may determine a mismatch between the monitored consumption metrics and expected consumption metrics (e.g., where "expected" consumption metrics may correspond to metrics associated with the same fixture type, conditions, etc. associated with smart lighting fixture 101). A "mismatch" may refer to the monitored consumption metrics falling outside of a range of expected consumption metrics for a given scenario (e.g., for a given brightness level, in given ambient conditions, etc.), and/or deviating from an expected value by at least a threshold amount (e.g., 25% outside expected values, 50% outside expected values, etc.).

Process 900 may further include identifying (at 910) a remedial measure based on the determined anomalous consumption. For example, as discussed above, the consumption model may be associated with one or more remedial actions, which may have been determined using analytical techniques or other suitable techniques. Such remedial actions may include cutting power to light output component 203, throttling power to light output component 203 (e.g., reducing a brightness level associated with smart lighting fixture 101), increasing power to light output component 203 (e.g., increasing a brightness level associated with smart lighting fixture 101), outputting an alert to/from SFOS 103 and/or some other device or system, or other suitable actions.

Process 900 may additionally include automatically performing (at 912) the remedial action. For example, FOC 207 may modify (e.g., via interface 205) a brightness level associated with light output component 203, output an alert to/from SFOS 103, and/or automatically perform some other remedial measure.

Figure 10:
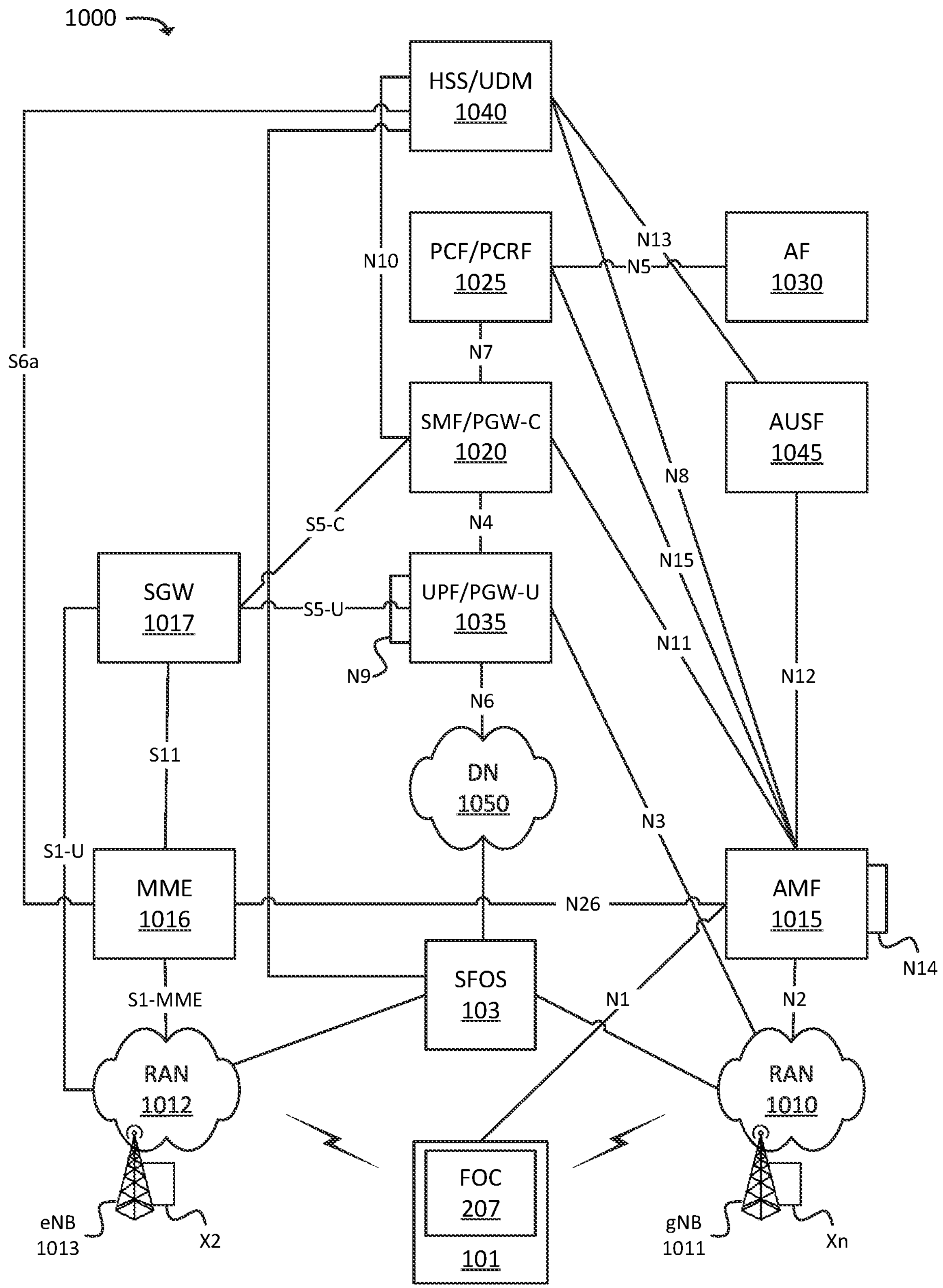
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include smart lighting fixture 101 (which may include and/or may be communicatively coupled to FOC 207, such as via interface 205 or some other suitable interface), RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. In some embodiments, network 205 may include DN 1050, may be included in DN 1050, and/or may be communicatively coupled to DN 1050. Environment 1000 may include one or more additional devices or systems communicatively coupled to one or more networks (e.g., DN 1050), such as SFOS 103.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

FOC 207 may include a computation and communication device, such as a wireless communication device that is capable of communicating with RAN 1010, RAN 1012, and/or DN 1050. In some embodiments, FOC 207 may be, or may include, a User Equipment ("UE") associated with a wireless network. In some embodiments, FOC 207 may be, may include, and/or may be communicatively coupled to a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. FOC 207 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which FOC 207 may communicate with one or more other elements of environment 1000. FOC 207 may communicate with RAN 1010 via an air interface (e.g., as provided by gNB 1011). For instance, RAN 1010 may receive traffic (e.g., voice call traffic, data traffic, messaging traffic, signaling traffic, etc.) from FOC 207 via the air interface, and may communicate the traffic to UPF/PGW-U 1035, and/or one or more other devices or networks. Similarly, RAN 1010 may receive traffic intended for FOC 207 (e.g., from UPF/PGW-U 1035, AMF 1015, and/or one or more other devices or networks) and may communicate the traffic to FOC 207 via the air interface.

RAN 1012 may be, or may include, a LTE RAN that includes one or more base stations (e.g., one or more eNBs 1013), via which FOC 207 may communicate with one or more other elements of environment 1000. FOC 207 may communicate with RAN 1012 via an air interface (e.g., as provided by eNB 1013). For instance, RAN 1010 may receive traffic (e.g., voice call traffic, data traffic, messaging traffic, signaling traffic, etc.) from FOC 207 via the air interface, and may communicate the traffic to UPF/PGW-U 1035, and/or one or more other devices or networks. Similarly, RAN 1010 may receive traffic intended for FOC 207 (e.g., from UPF/PGW-U 1035, SGW 1017, and/or one or more other devices or networks) and may communicate the traffic to FOC 207 via the air interface.

AMF 1015 may include one or more devices, systems, Virtualized Network Functions ("VNFs"), etc., that perform operations to register FOC 207 with the 5G network, to establish bearer channels associated with a session with FOC 207, to hand off FOC 207 from the 5G network to another network, to hand off FOC 207 from the other network to the 5G network, manage mobility of FOC 207 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register FOC 207 with the EPC, to establish bearer channels associated with a session with FOC 207, to hand off FOC 207 from the EPC to another network, to hand off FOC 207 from another network to the EPC, manage mobility of FOC 207 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of FOC 207. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for FOC 207, from DN 1050, and may forward the user plane data toward FOC 207 (e.g., via RAN 1010, SMF/PGW-C 1020, and/or one or more other devices). In some embodiments, multiple UPFs 1035 may be deployed (e.g., in different geographical locations), and the delivery of content to FOC 207 may be coordinated via the N9 interface (e.g., as denoted in FIG. 10 by the line marked "N9" originating and terminating at UPF/PGW-U 1035). Similarly, UPF/PGW-U 1035 may receive traffic from FOC 207 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with FOC 207.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. FOC 207 may communicate, through DN 1050, with data servers, other FOCs 207, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which FOC 207 may communicate.

SFOS 103 may include one or more devices, systems, VNFs, etc., that perform one or more operations described herein. For example, FOC 207 may generate, modify, and/or provide consumption models associated with smart lighting fixtures 101 (e.g., based on consumption metrics received from one or more FOCs 207). SFOS 103 may further provide such models and/or information derived from such models to FOCs 207 (e.g., via RAN 1010, RAN 1012, DN 1050, and/or via some other network), such that FOCs 207 may monitor consumption metrics associated with respective smart lighting fixtures 101 and perform remedial actions when anomalous power consumption is detected.

Figure 11:
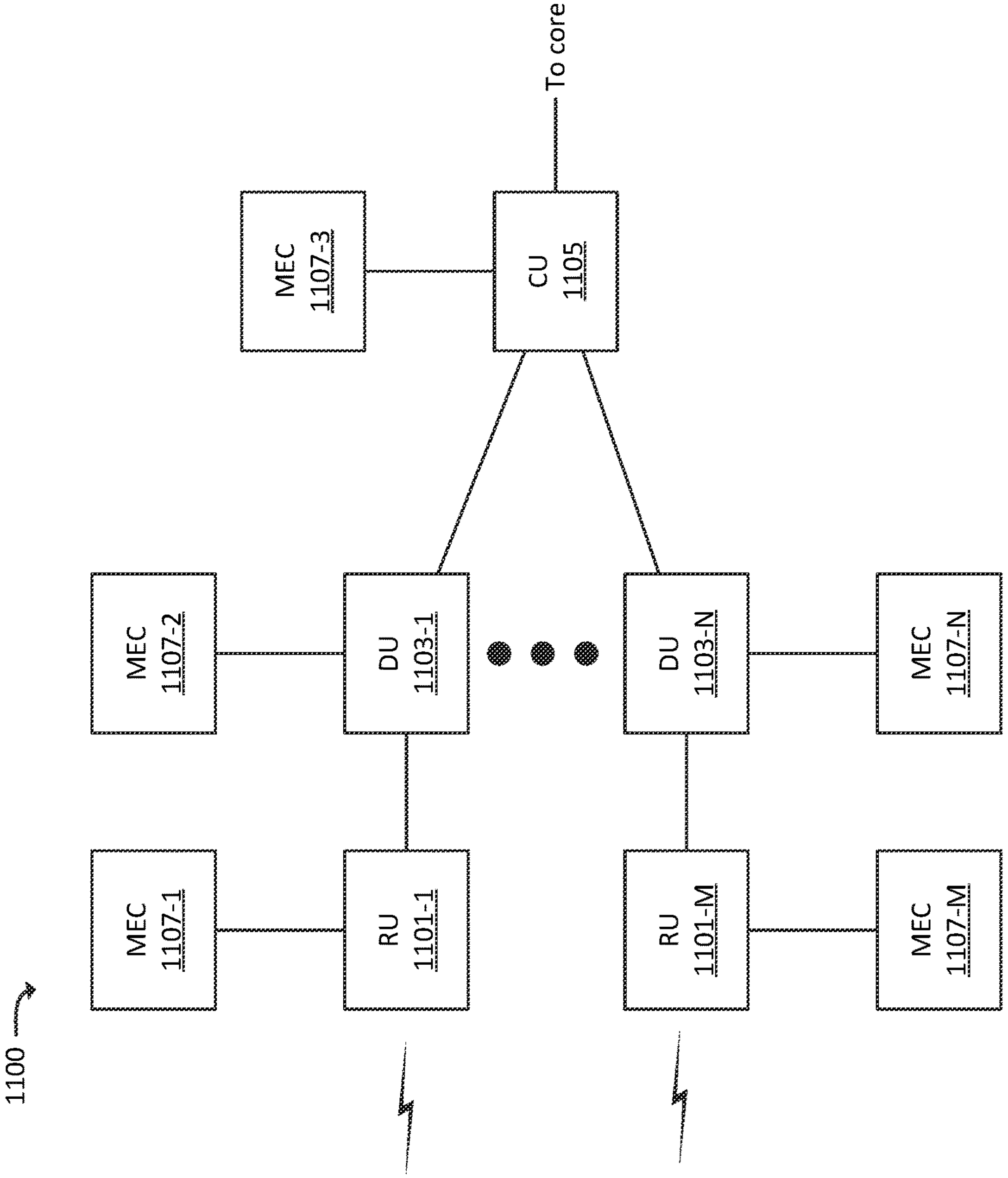
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from FOCs 207 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular FOC 207, and may determine which DU(s) 1103 should receive the downlink traffic. DU 1103 may include one or more devices that transmit traffic between a core network (e.g., via CU 1105) and FOC 207 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to FOC 207.

RU 1101 may include hardware circuitry (e.g., one or more RF transceivers, antennas, radios, and/or other suitable hardware) to communicate wirelessly (e.g., via an RF interface) with one or more FOCs 207, one or more other DUs 1103 (e.g., via RUs 1101 associated with DUs 1103), and/or any other suitable type of device. In the uplink direction, RU 1101 may receive traffic from FOC 207 and/or another DU 1103 via the RF interface and may provide the traffic to DU 1103. In the downlink direction, RU 1101 may receive traffic from DU 1103, and may provide the traffic to FOC 207 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from FOC 207, via a respective RU 1101.

For example, RU 1101-1 may route some traffic, from FOC 207, to MEC 1107-1 instead of to a core network (e.g., via DU 1103 and CU 1105). MEC 1107-1 may process the traffic, perform one or more computations based on the received traffic, and may provide traffic to FOC 207 via RU 1101-1. In this manner, ultra-low latency services may be provided to FOC 207, as traffic does not need to traverse DU 1103, CU 1105, and an intervening backhaul network between DU network 1100 and the core network. In some embodiments, MEC 1107 may include, and/or may implement, some or all of the functionality described above with respect to SFOS 103 and/or FOC 207.

Figure 12:
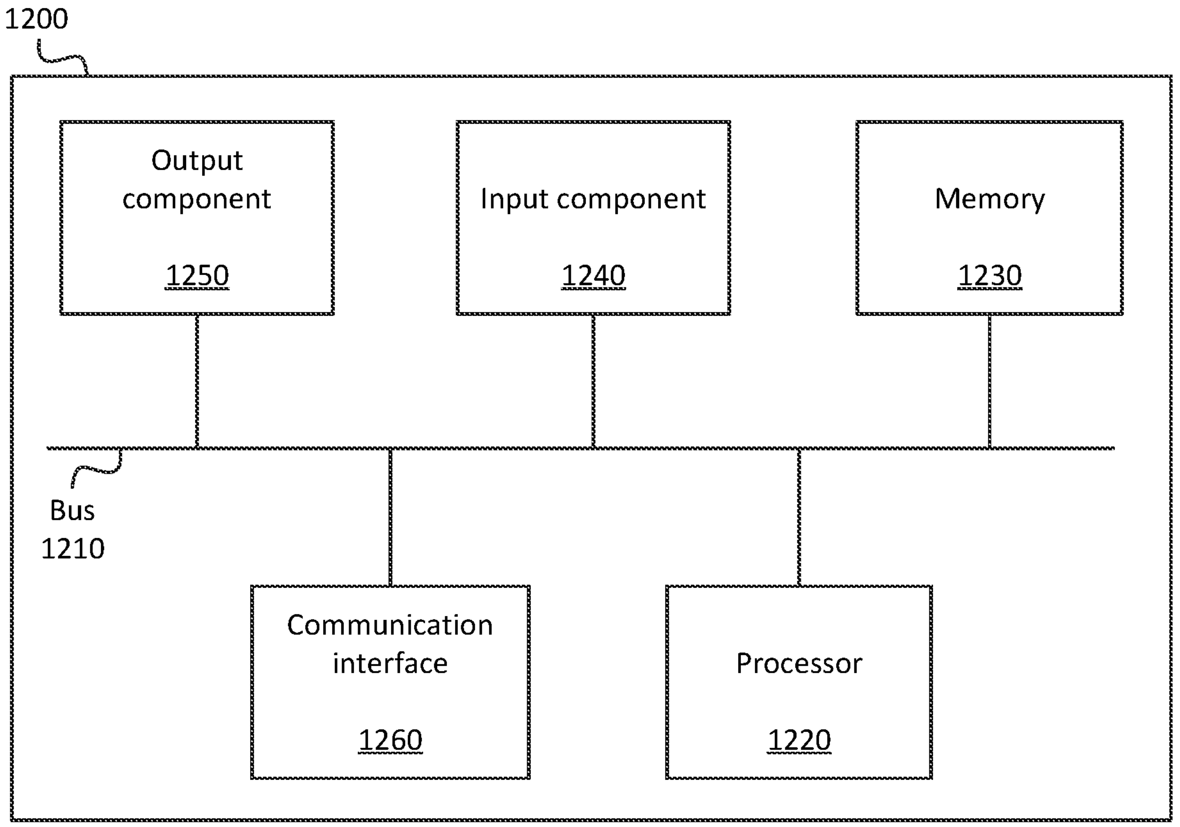
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

determine, for a configurable lighting device associated with a plurality of different brightness levels and under a first set of conditions, respective power consumption metrics at the plurality of different brightness levels associated with the configurable lighting device;

select a particular power consumption model, out of a plurality of power consumption models, based on the determined power consumption metrics, the particular power consumption model indicating expected power consumption metrics that correspond to respective brightness levels;

monitor power consumption metrics associated with the configurable lighting device under a different second set of conditions;

determine, based on the monitoring, a mismatch between the monitored power consumption metrics and expected power consumption metrics associated with the selected particular power consumption model; and modify, based on determining the mismatch between the monitored power consumption metrics and power consumption metrics, one or more configuration parameters of the configurable lighting device.

2. The device of claim 1, wherein the monitoring includes determining a particular power consumption metric associated with a particular brightness level of the configurable lighting device, and wherein detecting the mismatch includes determining a mismatch between the determined particular power consumption metric and a particular expected power consumption metric associated with the particular brightness level, as indicated by the particular power consumption model.

3. The device of claim 2, wherein the expected power consumption metric includes a range of values, and wherein detecting the mismatch includes determining that the particular power consumption metric is outside of the range of values.

4. The device of claim 1, wherein the first and second sets of conditions include at least one of:

differing measures of ambient temperature associated with the configurable lighting device, differing measures of temperature associated with a light output component of the configurable lighting device, differing measures of ambient light associated with the configurable lighting device, or differing measures of radio frequency ("RF") metrics associated with the configurable lighting device.

5. The device of claim 1, wherein the one or more processors are further configured to:

determine, based on the respective power consumption metrics at the plurality of different brightness levels associated with the configurable lighting device, a type associated with the configurable lighting device, wherein the particular power consumption model is selected based on the determined type associated with the configurable lighting device.

6. The device of claim 1, wherein the power consumption metrics are based on at least one of:

a rate of power consumption, an amount of power consumed over a particular period of time.

7. The device of claim 1, wherein modifying the one or more configuration parameters of the configurable lighting device includes modifying a brightness level of the configurable lighting device.

8. A non-transitory computer-readable medium, storing a plurality of processor-executable instructions to:

determine, for a configurable lighting device associated with a plurality of different brightness levels and under a first set of conditions, respective power consumption metrics at the plurality of different brightness levels associated with the configurable lighting device;

select a particular power consumption model, out of a plurality of power consumption models, based on the determined power consumption metrics, the particular power consumption model indicating expected power consumption metrics that correspond to respective brightness levels;

monitor power consumption metrics associated with the configurable lighting device under a different second set of conditions;

determine, based on the monitoring, a mismatch between the monitored power consumption metrics and expected power consumption metrics associated with the selected particular power consumption model; and modify, based on determining the mismatch between the monitored power consumption metrics and power consumption metrics, one or more configuration parameters of the configurable lighting device.

9. The non-transitory computer-readable medium of claim 8, wherein the monitoring includes determining a particular power consumption metric associated with a particular brightness level of the configurable lighting device, and wherein detecting the mismatch includes determining a mismatch between the determined particular power consumption metric and a particular expected power consumption metric associated with the particular brightness level, as indicated by the particular power consumption model.

10. The non-transitory computer-readable medium of claim 9, wherein the expected power consumption metric includes a range of values, and wherein detecting the mismatch includes determining that the particular power consumption metric is outside of the range of values.

11. The non-transitory computer-readable medium of claim 8, wherein the first and second sets of conditions include at least one of:

differing measures of ambient temperature associated with the configurable lighting device, differing measures of temperature associated with a light output component of the configurable lighting device, differing measures of ambient light associated with the configurable lighting device, or differing measures of radio frequency ("RF") metrics associated with the configurable lighting device.

12. The non-transitory computer-readable medium of claim 8, wherein the plurality of processor-executable instructions further include processor-executable instructions to:

determine, based on the respective power consumption metrics at the plurality of different brightness levels associated with the configurable lighting device, a type associated with the configurable lighting device, wherein the particular power consumption model is selected based on the determined type associated with the configurable lighting device.

13. The non-transitory computer-readable medium of claim 8, wherein the power consumption metrics are based on at least one of:

a rate of power consumption, or an amount of power consumed over a particular period of time.

14. The non-transitory computer-readable medium of claim 8, wherein modifying the one or more configuration parameters of the configurable lighting device includes modifying a brightness level of the configurable lighting device.

15. A method, comprising:

determining, for a configurable lighting device associated with a plurality of different brightness levels and under a first set of conditions, respective power consumption metrics at the plurality of different brightness levels associated with the configurable lighting device;

selecting a particular power consumption model, out of a plurality of power consumption models, based on the determined power consumption metrics, the particular power consumption model indicating expected power consumption metrics that correspond to respective brightness levels;

monitoring power consumption metrics associated with the configurable lighting device under a different second set of conditions;

determining, based on the monitoring, a mismatch between the monitored power consumption metrics and expected power consumption metrics associated with the selected particular power consumption model; and modifying, based on determining the mismatch between the monitored power consumption metrics and power consumption metrics, one or more configuration parameters of the configurable lighting device.

16. The method of claim 15, wherein the monitoring includes determining a particular power consumption metric associated with a particular brightness level of the configurable lighting device, and wherein detecting the mismatch includes determining a mismatch between the determined particular power consumption metric and a particular expected power consumption metric associated with the particular brightness level, as indicated by the particular power consumption model.

17. The method of claim 16, wherein the expected power consumption metric includes a range of values, and wherein detecting the mismatch includes determining that the particular power consumption metric is outside of the range of values.

18. The method of claim 15, wherein the first and second sets of conditions include at least one of:

differing measures of ambient temperature associated with the configurable lighting device, differing measures of temperature associated with a light output component of the configurable lighting device, differing measures of ambient light associated with the configurable lighting device, or differing measures of radio frequency ("RF") metrics associated with the configurable lighting device.

19. The method of claim 15, the method further comprising:

determining, based on the respective power consumption metrics at the plurality of different brightness levels associated with the configurable lighting device, a type associated with the configurable lighting device, wherein the particular power consumption model is selected based on the determined type associated with the configurable lighting device.

20. The method of claim 15, wherein modifying the one or more configuration parameters of the configurable lighting device includes modifying a brightness level of the configurable lighting device.

* * * * *